United States Patent
Cai et al.

(10) Patent No.: US 8,871,864 B2
(45) Date of Patent: Oct. 28, 2014

(54) ADHESIVE SYSTEM, METHOD OF ASSEMBLY OF DISTINCT COMPONENTS THEREWITH

(75) Inventors: Kevin G. Cai, Cumberland, RI (US); Darnell C. Worley, II, Uxbridge, MA (US)

(73) Assignee: Teknor Apex Company, Pawtucket, RI (US)

( * ) Notice: Subject to any disclaimer, the term of this patent is extended or adjusted under 35 U.S.C. 154(b) by 595 days.

(21) Appl. No.: 12/807,602

(22) Filed: Sep. 9, 2010

(65) Prior Publication Data

US 2012/0064356 A1    Mar. 15, 2012

(51) Int. Cl.

| | |
|---|---|
| *C09J 4/04* | (2006.01) |
| *C09J 5/00* | (2006.01) |
| *C09J 4/02* | (2006.01) |
| *C09J 4/06* | (2006.01) |
| *C08K 5/01* | (2006.01) |
| *C08K 5/49* | (2006.01) |
| *C08K 5/50* | (2006.01) |
| *C09J 11/06* | (2006.01) |
| *C08F 2/40* | (2006.01) |
| *C09J 4/00* | (2006.01) |
| *C08F 222/32* | (2006.01) |

(52) U.S. Cl.
CPC .............. *C09J 4/00* (2013.01); *C08F 222/32* (2013.01); *C08F 2/40* (2013.01)
USPC ............. 524/881; 524/115; 524/81; 524/706; 428/516; 428/522; 156/315

(58) Field of Classification Search
USPC ............ 524/881, 115, 81, 706, 154; 428/516, 428/522; 156/315
See application file for complete search history.

(56) References Cited

U.S. PATENT DOCUMENTS

| | | | |
|---|---|---|---|
| 3,260,637 A | 7/1966 | Bramer | |
| 3,699,127 A | 10/1972 | O'Sullivan et al. | |
| 3,742,018 A * | 6/1973 | O'Sullivan | 558/307 |
| 3,836,377 A | 9/1974 | Delahunty | |
| 3,865,776 A | 2/1975 | Gergen | |
| 4,170,585 A | 10/1979 | Motegi et al. | |
| 4,196,271 A | 4/1980 | Yamada et al. | |
| 4,200,549 A * | 4/1980 | Okamura et al. | 524/722 |

(Continued)

FOREIGN PATENT DOCUMENTS

| | | |
|---|---|---|
| EP | 0 295 013 | 12/1988 |
| EP | 0295013 A2 | 12/1988 |

(Continued)

OTHER PUBLICATIONS

JP 02120378 A, May 1990, Derwent Abstract.*

(Continued)

*Primary Examiner* — Satya Sastri
(74) *Attorney, Agent, or Firm* — Hudak, Shunk & Farine Co. LPA

(57) ABSTRACT

An adhesive system including a cyanoacrylate adhesive composition having a polymerization retarder that slows the polymerization rate of the cyanoacrylate, increases the lubricity to achieve proper assembly and aids in achieving desirable bonding properties of the adhesive; and a phosphorous-based primer that assists in preparing the components to be bonded. Methods of connecting dissimilar materials, preferably those used in medical applications, utilizing the adhesive system and the resulting adhered assemblies are disclosed.

17 Claims, 1 Drawing Sheet

(56) References Cited

U.S. PATENT DOCUMENTS

| | | | |
|---|---|---|---|
| 4,321,180 A | | 3/1982 | Kimura et al. |
| 4,386,193 A | | 5/1983 | Reich et al. |
| 4,424,387 A | | 1/1984 | Kramer |
| 4,818,325 A | * | 4/1989 | Hiraiwa et al. ............... 156/315 |
| 4,869,772 A | | 9/1989 | McDonnell et al. |
| 4,979,993 A | | 12/1990 | Okamoto et al. |
| 5,066,743 A | | 11/1991 | Okamoto et al. |
| 5,314,562 A | | 5/1994 | McDonnell et al. |
| 5,837,092 A | | 11/1998 | Grieves et al. |
| 6,583,250 B2 | * | 6/2003 | Birnbrich et al. ............. 526/259 |
| 6,590,033 B2 | | 7/2003 | Ding et al. |
| 6,613,187 B1 | | 9/2003 | Ding et al. |
| 6,649,681 B2 | | 11/2003 | Rohn et al. |
| 6,663,957 B1 | | 12/2003 | Takushima et al. |
| 6,846,535 B2 | | 1/2005 | De Groot et al. |
| 7,001,947 B2 | * | 2/2006 | Cordova ....................... 524/555 |
| 2003/0164222 A1 | * | 9/2003 | Kneafsey et al. ............. 156/314 |
| 2010/0098586 A1 | | 4/2010 | Lopez et al. |

FOREIGN PATENT DOCUMENTS

| | | | |
|---|---|---|---|
| JP | 63162781 | | 7/1988 |
| JP | 02120378 A | * | 5/1990 |
| JP | 6122855 | | 5/1994 |
| JP | 11106372 A | * | 4/1999 |
| JP | 2002020700 A | * | 1/2002 |

OTHER PUBLICATIONS

JP 02120378 A, May 1990, English Abstarct.*
http://www.sigmaaldrich.com/catalog/product/aldrich/b85501?lang=en&region=US., 2013.*
JP 2002020700 A, Ando et al., Jan. 2002, Machine translation.*
JP 11106372 A, Yamada et al., Apr. 1999, English Ab.*
International Search Report dated Jan. 17, 2012.
Supplementary European Search Report dated Mar. 27, 2014.

* cited by examiner

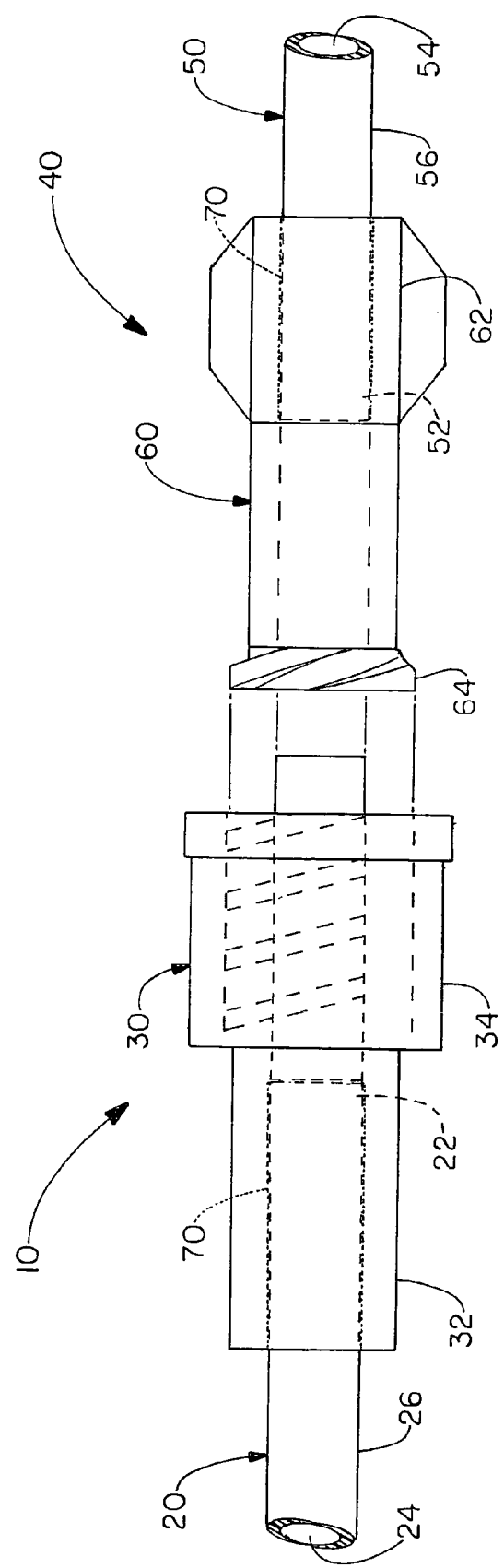

ADHESIVE SYSTEM, METHOD OF ASSEMBLY OF DISTINCT COMPONENTS THEREWITH

FIELD OF THE INVENTION

The present invention relates to an adhesive system including a cyanoacrylate adhesive composition having a polymerization retarder that slows the polymerization rate of the cyanoacrylate, increases lubricity of the adhesive, and aids in achieving desirable bonding properties of the adhesive; and a phosphorous-based primer composition that assists in preparing the components to be bonded. Methods of connecting dissimilar materials, preferably those used in medical applications, utilizing the adhesive system and the resulting adhered assemblies are disclosed.

BACKGROUND OF THE INVENTION

Many different materials have been utilized in the medical and, fluid transfer fields in applications, for example dairy transfer products such as dairy tubing, containers, IV bags, blood bags, medical connectors, medical tubing, mask covers, asthma bags, syringes, medical drapery, catheters and various scopes. Polyvinyl chloride (PVC) has been used in such applications but organizations are looking for alternatives to PVC. Other materials utilized include polyolefins, polyesters, polyurethanes, acrylonitrile butadiene styrene (ABS), polycarbonates, and acrylics. Due to the differences in materials utilized to form the various components, it can be difficult to obtain good adhesion between the same using various available adhesives. For example, bonding polyolefins or other non-polar polymers to themselves or other materials with traditional adhesive is difficult due to low polarity or surface energy. Examples of various polymeric materials are found in U.S. Pat. Nos. 6,846,535, 6,590,033, 6,583,250, 3,865,776 and U.S. Publication 2010/0098586, herein fully incorporated by reference.

Various adhesives have been developed to bond polymeric materials, some intended for use as medical materials.

U.S. Pat. No. 6,649,681 to Rohn et al. relates to an adhesive composition for use in bonding a polymeric fitting to an olefin-containing component of an article used in medical applications. The adhesive composition according to the invention includes an adhesive polymer system dissolved in a solvent system. The solvent system includes an organic solvent having a solubility parameter within the range of about 7.5 to about 10 $(cal/cm^3)^{1/2}$. The adhesive composition includes a low shear mixture of an adhesive polymer system including an atactic polypropylene and a low density polyethylene that is dissolved in a solvent system including a blend of d-limonene and a ketone selected from the group consisting of 4-heptanone and cyclohexanone. The adhesive composition reportedly can be used, for example, to bond polymeric fittings made of materials such as, but not limited to, acrylic, polycarbonate, polyvinyl chloride, polyolefin, acrylonitrile butadiene-styrene, and polyester, to olefin-containing components of articles used in medical applications such as, but not limited to, tubing. In actual application, such adhesives do not provide consistent and sufficient adhesion for parts made with low polarity polymers like polyolefins.

U.S. Pat. No. 6,613,187 to Ding et al. relates to a method for using a polymeric cement to assemble medical devices. The method includes the steps of: (1) providing a first article of a low crystallinity polymer; (2) providing a second article of a low crystallinity polymer; (3) providing a cement composition having a first component of a cyclic olefin containing polymer or a bridged polycyclic hydrocarbon containing polymer and a second component of an effective amount of a solvent having a solubility parameter of less than about 20 $(MPa)^{1/2}$; applying the cement composition to one of the first and second articles to define a bonding area; and (4) attaching the first article to the second article along the bonding area to fixedly attach the first article to the second article.

U.S. Pat. No. 5,837,092 to Grieves et al. relates to a diamine primer for the promotion of bonding of a first plastic substrate to a second plastic substrate with an adhesive such as a cyanoacrylate.

U.S. Pat. No. 5,314,562 to McDonnell et al. relates to a method of bonding a plastic substrate with an alpha-cyanoacrylate adhesive in which a primer comprising an ethylenediamine is used. The method is reportedly suitable for use in bonding polyolefins in the consumer market.

U.S. Pat. No. 4,979,993 to Okamoto et al. relates to a tertiary ammonium alkyl carboxylate primer for bonding surfaces with cyanoacrylate adhesives, and to a method of bonding low surface energy surfaces using such tertiary ammonium alkyl carboxylates. A preferred primer is tridodecylammonium stearate and preferred solvents for the tertiary ammonium alkyl carboxylate are nonaqueous, low surface tension organic solvents.

U.S. Pat. No. 4,869,772 to McDonnell et al. relates to process for priming a non-polar substrate such as a polyolefin for bonding with a cyanoacrylate adhesive, the use of an adhesion-promoting primer comprising at least one diazabicyclo or triazabicyclo compound.

U.S. Pat. No. 3,260,637 to von Bramer relates the use of promoters with α-cyanoacrylate adhesive compositions, and is particularly concerned with reportedly improved adhesive action of such compositions for bonding metallic and non-metallic surfaces.

European Patent 0295013 to Loctite (Ireland) Ltd. relates to a process reportedly for conditioning a non-polar substrate such as a polyolefin for bonding with a cyanoacrylate adhesive, the use of an adhesion-promoting primer comprising a primary aliphatic amine. The primer also contains a solvent. The primer is applied to the substrate for a period of 30 seconds to 30 minutes and allowed to dry before the adhesive is applied.

For medical devices with tubing connected through connectors, especially female connectors made with various engineering plastics, the use of cyanoacrylate with some primers often cures too fast and does not allow proper assembly or does not have enough bonding strength between the tubing and connectors. In view of the above, it would be desirable to provide an adhesive system capable of providing excellent adhesion between two articles formed from the same polymer or a polymer and a dissimilar material, especially between a polyolefin and a different material, for example polymer, ceramic, glass or metal, excellent retention force, and clean appearance such as characterized by being substantially free from any white residue.

SUMMARY OF THE INVENTION

Therefore, it is an object of the present invention to provide an adhesive system for bonding a polymer to itself or another material including dissimilar polymers, metals, glass and ceramics, etc. and comprising a cyanoacrylate-based adhesive and a phosphorous-based primer.

An additional object of the present invention is to provide an adhesive system comprising a polymerization retarder and lubricant that slows the polymerization rate to allow proper assembly and achieve good bond strength between the two materials.

An additional object of the present invention is to provide a polymerization retarder and lubricant having a relatively high boiling point such as greater than 100° C.

A further object of the present invention is to provide an adhesive system capable of providing a desirable retention force between two different polymeric components or connectors.

Still another object of the present invention is to provide an adhesive system that when polymerized or cured has a clean appearance and is substantially free from white residue.

Yet another object of the present invention is to provide a method for joining dissimilar polymers including the step of applying a primer to one or more of first and second polymers, applying an adhesive to one or more of the dissimilar polymers, and contacting the first polymer with the second polymer and allowing the adhesive to cure or polymerize whereby the adhesive connects the first polymer and the second polymer.

Yet another object of the present invention is to provide a method for joining tubing with a connector utilizing an adhesive system including a phosphorous-based primer and a cyanoacrylate-based adhesive.

A further object of the present invention is to provide a method for joining medical tubing with a medical connector utilizing an adhesive system including a primer and a cyanoacrylate-based adhesive.

A further object of the present invention is to provide a method for joining medical tubing with a medical connector utilizing a cyanoacrylate adhesive including a polymerization retarder that slows polymerization of the adhesive and further priming the materials prior to bonding utilizing a phosphorus containing primer.

An additional object of the present invention is to provide a bonded assembly including a first polymer and a second polymer formed from different materials and connected together by an adhesive system including a cyanoacrylate-based adhesive and a phosphorus containing primer.

A further object of the present invention is to provide the assembly wherein the adhesive system includes a polymerization retarder that prolongs the curing time of the cyanoacrylate and further lubricates the adhesive in order to form a desirable bond between the first and second polymers.

Yet another object of the present invention is to provide an assembly wherein the first polymer is a medical tube and the second polymer is a medical connector or wherein the first polymer is a tape such as a medical tape that is bonded to a second article or itself.

In one aspect of the present invention an adhesive system for connecting two different polymer materials is provided comprising an adhesive comprising a cyanoacrylate adhesive and a polymerization retarder having a boiling point greater than 100° C.; and a primer comprising a phosphorous-containing compound in a carrier.

Another aspect of the present invention is to provide a method for bonding two dissimilar or low polarity polymeric materials, comprising the steps of applying a primer composition comprising a phosphorous-containing compound in a carrier liquid to a portion of an article comprising a first polymer; applying an adhesive composition comprising a cyanoacrylate composition and a polymerization retarder to a portion of the article comprising the first polymer; wherein the polymerization retarder is a liquid having a boiling point great than 100° C.; and contacting the adhesive coated portion of the first article with a second article and allowing the adhesive to bond the first article to the second article.

A further aspect of the present invention is to provide an adhesive bonded assembly, comprising a first article comprising a first polymer bonded by an adhesive system to a second article, the adhesive system derived from cyanoacrylate adhesive composition derived from cyanoacrylate adhesive and a liquid polymerization retarder having a boiling point greater than 100° C., and the primer comprising a phosphorous-containing compound in a carrier liquid.

BRIEF DESCRIPTION OF THE DRAWINGS

The invention will be better understood and other features and advantages will become apparent by reading the detailed description of the invention, taken together with the drawings, wherein:

FIG. 1 is an elevational view of one embodiment of two different assemblies of the present invention each consisting of a tube and a connector that can be interconnected, wherein tubes are adhered to connectors by an adhesive system of the present invention.

DETAILED DESCRIPTION OF THE INVENTION

The adhesive system of the invention is utilized to bond two articles, preferably of different composition. One article is preferably a polyolefin or other lower polarity or non-polar polymer that is relatively difficult to bond with a traditional adhesive due to relatively low polarity. In one embodiment, the articles are components or devices, such as but not limited to, tubing preferably medical tubing or dairy tubing, tubing connectors, containers, tape, fluid bags such as IV and blood bags, asthma bags, Y-sites, injection sites, housings, spikes, syringes, syringe bands, medical drapery, catheters, mask covers, closures, and drip chambers.

As a non-limiting example, FIG. 1 illustrates one embodiment of a pair of assemblies 10, 40 including a first assembly 10 comprising a first article 20, namely a tube bonded to a second article 30, namely a connector by an adhesive system 70 and a second assembly 40 comprising a first article 50, also a tube, bonded to a second article 60, namely another connector by adhesive system 70. The tube that forms first article 20 includes a substantially cylindrical outer diameter or surface 26 and an inner diameter 24 through which a fluid is adapted to flow. The article 20 has a first end 22 that serves as a male connection that has been inserted into female connector 32 of the second article 30 and adhered by the adhesive system 70. Second article 30 includes an additional female connector 34 connected at an end opposite female connector 32 for connection to a mateable male portion of assembly 40. The first article 20 has a first portion that is bonded to a second portion of the second article 30. The second assembly 40 is a first article 50, namely a tube having a first end 52 connected within the female connector 62 of the second article 60. Article 50 also has an outer diameter 56 and an inner diameter 54 through which fluid is adapted to flow. The male end 64 of article 60 is adapted to be threadable within the female connector 34 of article 30. As illustrated in FIG. 1, preferably the outer diameter of the tube is adhered to the inner diameter of the connector, i.e. the tube is connected to a female connector. In some other embodiments, the inner diameter of the tube is adhered to the outer diameter of the connector.

The adhesive system includes a synergistic combination of a cyanoacrylate adhesive composition and a primer composition that is applied to an area to be bonded of one or more of the articles to be bonded and allowed to substantially dry prior to the adhesion composition being applied thereover.

The primer composition according to the invention comprises a phosphorous-containing compound, preferably dissolved in a carrier when the phosphorous-containing compound is a solid. The phosphorous-containing compounds have been found to beneficially prepare or activate the desired surfaces of the articles to be bonded. The phosphorous-containing compound is believed to be a catalyst for the polymerization of cyanoacrylate, which drives the polymerization to completion without speeding up the polymerization rate too much, which allows enough time for proper assembly. The phosphorous-containing compound is also believed to increase the bondability of the adhesive composition, therefore aiding in providing greater bonding strength.

Various phosphorous-containing compounds can be used in the invention. Examples of suitable phosphorous compounds are phosphines and their derivatives. The phosphines can be aromatic-containing phosphines, and alkyl-containing phosphines.

Examples of suitable phosphines include, but are not limited to phosphines such as aromatic-containing phosphines, for example phenylphosphine, diphenylphosphine, and triphenyl phosphine; alkyl-containing phosphines such as methyl phosphine, diethyl phosphine, ethyl phosphine, dichlorodiphenyl phosphine, dichlorophenyl phosphine, and dimethyphenyl phosphine. The phosphines can be a salt, include a metal halogen and/or a functional group.

In one embodiment the phosphorus-containing compounds, namely phosphines, have the following formula:

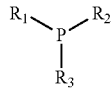

wherein each $R_1$, $R_2$, $R_3$, independently is hydrogen; a halogen; a salt or metal such as but not limited to sodium, potassium, magnesium, manganese, ammonium, calcium, and iron; an alkyl group having from 1 to 30 carbon atoms optionally substituted; an aromatic or alkylaromatic group having from 6 to about 36 carbon atoms; optionally substituted aliphatic and/or aromatic containing ether or ester groups having from 2 to about 30 carbon atoms, optionally substituted. Examples of substituents include, but are not limited to said halogen atoms, said metals, said salts, and functional groups such as hydroxyl groups, sulfhydryl groups, carboxyl groups, carbonyl groups, amino groups, cyano groups, nitro groups, etc.

The carrier of the primer composition is preferably a low boiling point liquid that is able to evaporate at normal use temperatures, i.e. around room temperature (about 22° C.) and generally from about 10° C. to about 40° C. within a reasonable time, generally less than about one minute. Examples of suitable carriers include, but are not limited to various hydrocarbon and non-polar organic solvents, for example naphtha, hydrotreated light naphtha, hexane, and heptane. Mixtures of two or more carriers can be utilized.

The phosphorous-containing compound is preferably utilized in the carrier discussed herein, at a concentration of from about 0.01 part to about 20 parts by weight based on 100 total parts by weight of a primer composition. Preferably the phosphorous-based compound is present in the amount of about 0.05 part to about 1, 5 or 10 parts by weight per 100 parts of the primer composition. The primer composition comprising the phosphorous-containing compound in the liquid medium may be applied to the substrate or article surface to be bonded with the cyanoacrylate adhesive in any manner that is satisfactory to effect enhanced adhesion of the adhesive to the substrate, as for example, by spraying, dipping, brushing, swabbing, wiping, coating, or the like as known to those of ordinary skill in the art. One or both surfaces of the first article and the second article may be primed. In a preferred embodiment, at least the article formed of a polymer that is relatively difficult to bond is treated with a primer, for example a tube in one embodiment.

After the primer solution is applied to the substrate article surfaces to be adhesively bonded, the cyanoacrylate adhesive composition is applied to one or both of the primer composition-treated portion of the surfaces. The substrates are then contacted or brought together to effect adhesive bonding of the articles and to form the bonded assembly.

The thickness of the primer may vary widely depending upon the character and composition of the article surfaces to be bonded as well as the nature of the end use of the bonded assembly. Typically one application of the primer composition is sufficient, but multiple coatings or layers may be applied.

The cyanoacrylate adhesive composition includes a cyanoacrylate adhesive. Suitable cyanoacrylate adhesives for use with the primer of this invention are represented by the general formula

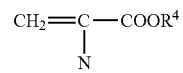

wherein $R^4$ is alkyl, alkenyl, cycloalkyl, aryl, alkoxyalkyl, aralkyl, haloalkyl or another suitable group. The lower alkyl alpha-cyanoacrylates are preferred, and in particular methyl, ethyl, n-propyl, n-butyl, isobutyl, isopropyl, allyl, cyclohexyl, methoxyethyl or ethoxyethyl cyanoacrylates.

Many alpha-cyanoacrylates can be obtained commercially as one component instant adhesives, for example from Loctite, 3M and Permabond.

Examples of such cyanoacrylates are methyl-2-cyanoacrylate, ethyl-2-cyanoacrylate, n-propyl-2-cyanoacrylate, isopropyl-2-cyanoacrylate, n-butyl-2-cyanoacrylate, tert-butyl-2-cyanoacrylate, sec-butyl-2-cyanoacrylate, n-pentyl-2-cyanoacrylate, isopentyl-2-cyanoacrylate, n-hexyl-2-cyanoacrylate, n-heptyl-2-cyanoacrylate, n-octyl-2-cyanoacrylate, cyclohexyl-2-cyanoacrylate, allyl-2-cyanoacrylate, ethoxyethyl-2-cyanoacrylate, trifluoropropyl-2-cyanoacrylate, 2-chloroethyl-2-cyanoacrylate, 2,2,2-trifluoroethyl-2-cyanoacrylate and 2-trifluoromethyl-2-cyanoacrylate.

While these commercially available cyanoacrylates are composed principally of alpha-cyanoacrylate monomer, the formulation may contain stabilizers, thickeners, adhesion promoters, plasticizers, dyes, heat resistant additives, impact resistance modifiers, and the like. The adhesives may also contain fillers of which the principal function is to modify their rheological properties because the cyanoacrylates are generally low-viscosity materials. Modified viscosity is particularly desirable in regard to the ability of the adhesives to fill gaps between the substrates to be bonded. Suitable fillers are, for example, poly(ethyl-2-cyanoacrylate), polymethyl methacrylate (PMMA), cellulose esters, polyvinyl methyl ethers, tris-(hydroxyalkyl)-cyanuric and phosphonic acid, polycarbonates, polyvinylidene fluorides, polyethylene, acrylate elastomer copolymers or heated PMMA. Other fillers for modifying impact strength include, for example, polycarboxylic acids, such as 1,1,2,2-ethylene tetracarboxylic acid or thiodisuccinic acid, or lactones, such as butyrolactone, pivalolactone, y-caprolactone, carbethoxybutyrolactone, phthalide lactone, coumarin lactone or e-caprolactone. Solid mineral fillers, such as quartz, aluminum oxide or calcium carbonate, can also provide the adhesives with advantageous properties. Maleic anhydride may be added to improve thermal stability and/or tensile strength. By mixing with heat-activatable radical polymerization initiators, the adhesive bond can be strengthened by subsequent heating. Other additives include, for example, maleic acid dimethyl ester, maleic acid diethyl ester, maleic acid dipropyl ester, maleic acid dibutyl ester, maleic acid diallyl ester, fumaric acid dimethyl ester, fumaric acid diethyl ester, fumaric acid dipropyl ester, bis-(2-ethylhexyl)-fumarate, didodeceyl maleate. The function of these additives is not only to exert a plasticizing effect, but also to reduce the acrylate content of the starting material. Other plasticizers include aryl aryl or aryl alkyl ethers, the alkyl moiety normally consisting of a linear or branched, saturated or unsaturated alkyl chain containing 1 to 22 carbon atoms. Additional cyanoacrylate adhesive compositions are disclosed in U.S. Pat. Nos. 4,386,193; 4,170,585; 4,424,387; 4,321,180; 4,196,271; 3,699,127 and 3,836,377, all herein fully incorporated by reference.

Another important aspect of the present invention is the inclusion of a polymerization retarder and lubricant in the cyanoacrylate adhesive that is used to slow the polymerization or cure of the cyanoacrylate. The term "polymerization retarder" when utilized herein refers to the polymerization retarder and lubricant, unless specifically stated otherwise. The polymerization retarder has been found to increase the bond strength of the assembly. Also the polymerization retarder aids in lubricating the surfaces of the articles to be bonded and particularly aids in joining a tube to a suitable connector.

The polymerization retarder is a high boiling point liquid having a boiling point greater than about 100° C. to about 260° C. Non-polar polymerizations retarders are preferred. Suitable polymerization retarders include, but are not limited to toluene, xylene, branched aliphatic hydrocarbons, for example dimethylhexane, trimethylpentane, methylheptane, dimethylheptane, ethylheptane, trimethylheptane, dimethyloctane, ethyloctane, methylnonane, isodecane and isododecane; mineral oil, and combinations thereof. Toluene and/or xylene are preferred in one embodiment.

The polymerization retarder is present in the adhesive composition of the present invention in an amount generally from about 1 to about 65 parts and preferably in an amount of about 3 to about 25 or 55 parts based on 100 parts by weight of the total adhesive composition.

The polymer articles of the invention can be formed from any of a number of polymers. In one embodiment, at least one article comprises a low polarity polymer, for example a polyolefin, thermoplastic elastomer, or a thermoplastic vulcanizate. Polymeric articles utilized in medical, dairy or other fluid transfer applications are typically formed from materials such as, but not limited to, polyolefins, polycarbonate resins, acrylic resins, acrylonitrile-butadiene-styrene resins, polyesters, olefin-containing alloys, EPDM rubber, polyacetals, polyamides such as nylon, fluorocarbon polymers such as polytetrafluoroethylene and various thermoplastic elastomers and thermoplastic elastomer vulcanizates, such as styrenic block polymers and polypropylene/EPDM based TPV. The polyolefins, of course, include, for example, polypropylene, polyethylene, and polybutylene, and various grades thereof. Examples of suitable styrenic block polymer containing compositions are set forth in U.S. Pat. No. 6,846,535, herein fully incorporated by reference. Of course, mixtures of the above polymers, where appropriate, can also be utilized.

The adhesive composition comprising the cyanoacrylate adhesive and the polymerization retarder may be applied to the article's surface itself or a surface that has been primed with a primer composition. After the primer solution is applied to the desired surface(s) and preferably substantially allowed to dry, the cyanoacrylate adhesive composition is placed thereon, such as by spraying, dipping, brushing, swabbing, wiping, coating, or the like. The articles are then brought together and contacted at the desired locations in order to effect adhesive bonding of the article elements and to form the bonded assembly. The thickness of the adhesive layer ranges generally from about 0.254 to about 508 micrometers (0.01 mil to 20 mil), desirably, about 1.27 to about 127 micrometers (0.05 mil to 5 mil), and preferably from about 5.08 to about 50.8 micrometers (0.2 mil to 2 mil). Any excess amount of adhesive outside of the bonding surface should be removed to ensure a clean bonded assembly is formed that is clear and substantially free from generally any residue such as a white residue.

EXAMPLES

In order to illustrate the benefits of the adhesive system of the present invention, various adhesive systems were prepared and utilized to bond a first article, namely a tube, to a second article, a connector sometimes referred to in the medical field as a Luer lock connector. The tubing utilized had a 0.16 inch outer diameter and 0.10 inch inner diameter. The tubing was formed from a low-polarity polymer composition, namely thermoplastic elastomer comprising a styrenic block copolymer and a polyolefin. The Shore A hardness of the thermoplastic elastomer is set forth in Table 1. Connectors of the indicated composition were purchased from Qosina of Edgewood, N.Y. The inner diameter of the portion of the connector connected to the tube outer diameter was about 0.16 inch. The primer composition comprised about 0.1% triphenylphosphine in hydrotreated light naphtha as a carrier. The adhesive was ethylcyanoacrylate (90%) combined with low molecular weight acrylic polymer (10%). When a polymerization retarder was present, the indicated percentage was based upon the total weight of the adhesive plus polymerization retarder. The primer solution was applied through spraying, brushing or dipping to the end of the tubing to be bonded. After most of the carrier in the primer was evaporated, the cyanoacrylate adhesive/retarder mixture was applied through a dispenser or by a brush to the primed surface of the tube. The tubing was pushed into the female connector. If necessary the tubing was adjusted in the connector to allow proper wetting of the connector with the adhesive. The retention force of the assembly of the tubing and connector was measured on an Instron tensile instrument at 20 in/min speed with one inch tubing sample length between the Instron clamp and the tubing/connector line. The results of the average retention force of the adhered assemblies are set forth in Table 1 below.

TABLE 1

| Examples | Polymerization Retarder | Primer | Tubing TPE Material Hardness[1] | Connector | Easy to Assemble | Average Retention Force (lbf) |
|---|---|---|---|---|---|---|
| Comparative #1 | No | No | 75A | Acrylic | No | 6.6 |
| Comparative #2 | No | No | 85A | Acrylic | No | 12.0 |
| Comparative #3 | No | No | 75A | ABS | No | 6.6 |
| Comparative #4 | No | No | 85A | ABS | No | 11.5 |
| 1 | No | Yes | 65A | Acrylic | No | 10.4 |
| 2 | No | Yes | 75A | Acrylic | No | 13.3 |
| 3 | No | Yes | 85A | Acrylic | No | 16.5 |
| 4 | No | Yes | 65A | ABS | No | 9.2 |
| 5 | No | Yes | 75A | ABS | No | 11.1 |
| 6 | No | Yes | 85A | ABS | No | 17.5 |
| 1A | 5% xylene | Yes | 65A | Acrylic | Yes | 10.4 |
| 2A | 5% xylene | Yes | 75A | Acrylic | Yes | 13.7 |
| 3A | 5% xylene | Yes | 85A | Acrylic | Yes | 18.5 |
| 4A | 5% xylene | Yes | 65A | ABS | Yes | 9.2 |
| 5A | 5% xylene | Yes | 75A | ABS | Yes | 13.1 |
| 6A | 5% xylene | Yes | 85A | ABS | Yes | 19.1 |
| 2B | 10% xylene | Yes | 75A | Acrylic | Yes | 13.7 |
| 5B | 10% xylene | Yes | 75A | ABS | Yes | 12.5 |
| 2C | 20% xylene | Yes | 75A | Acrylic | Yes | 12.9 |
| 5C | 20% xylene | Yes | 75A | ABS | Yes | 12.6 |
| 1D | 50% Toluene | Yes | 65A | Acrylic | Yes | 7.8 |
| 2D | 50% Toluene | Yes | 75A | Acrylic | Yes | 10.5 |
| 3D | 50% Toluene | Yes | 85A | Acrylic | Yes | 13.6 |
| 4D | 50% Toluene | Yes | 65A | ABS | Yes | 8.0 |
| 5D | 50% Toluene | Yes | 75A | ABS | Yes | 9.7 |
| 6D | 50% Toluene | Yes | 85A | ABS | Yes | 13.7 |

[1]ASTM D-2240

Table 1 illustrates, that the adhesive system of the present invention including a cyanoacrylate adhesive and a phosphorous-containing primer provided better average retention force when compared to the formulations not utilizing the phosphorous-containing primer. Additional benefits of utilizing the polymerization retarder in various amounts within the cyanoacrylate adhesive composition and along with the phosphorous-containing primer composition of the invention are also illustrated in Table 1.

While in accordance with the patent statutes, the best mode and preferred embodiment have been set forth, the scope of the invention is not limited thereto, but rather by the scope of the attached claims.

What is claimed is:

1. An adhesive system, comprising:
   a liquid cyanoacrylate-based adhesive composition consisting essentially of a cyanoacrylate adhesive and a polymerization retarder, wherein the polymerization retarder is a liquid having a boiling point greater than 100° C., wherein the polymerization retarder is one or more of toluene, xylene, a branched aliphatic hydrocarbon and mineral oil; and a liquid primer composition comprising a phosphorous-containing compound in a carrier liquid.

2. The adhesive system according to claim 1, wherein the phosphorous-containing compound is a phosphine, and wherein the phosphine is present in the carrier in an amount from about 0.01 to about 20 parts by weight based on 100 total parts by weight of the primer composition.

3. The adhesive system according to claim 2, wherein the phosphine has the formula $$R_1\underset{R_3}{\overset{}{\underset{|}{-}}}P{-}R_2$$

wherein each $R_1$, $R_2$, $R_3$, independently is hydrogen; a halogen; an alkyl group having from 1 to 30 carbon atoms optionally substituted; an aromatic or alkylaromatic group having from 6 to about 36 carbon atoms; optionally substituted aliphatic and/or aromatic containing ether or ester group having from 2 to about 30 carbon atoms, optionally substituted, and wherein the carrier is a low boiling point liquid able to evaporate at a temperature between 10° C. and 40° C.

4. The adhesive system according to claim 3, wherein the polymerization retarder is present in an amount of from 1 to about 65 parts by weight based upon 100 total parts by weight of the adhesive composition, and wherein the primer composition carrier liquid is one or more of a hydrocarbon and a non-polar organic solvent.

5. The adhesive system according to claim 4, wherein the phosphine is present in the carrier liquid in an amount from about 0.05 to about 1 part by weight per 100 parts by weight of the primer composition, and wherein the polymerization retarder is present in an amount of about 3 to about 25 parts by weight per 100 total parts by weight of the adhesive composition.

6. The adhesive system according to claim 1, wherein the polymerization retarder is one or more of toluene and xylene, wherein the phosphorous-containing compound is triphenylphosphine, wherein the primer composition carrier liquid is one or more of naphtha, hydrotreated light naphtha, hexane, and heptane, and wherein the cyanoacrylate adhesive comprises ethylcyanoacrylate.

7. An adhesive system, comprising:
   a liquid cyanoacrylate-based adhesive composition comprising a cyanoacrylate adhesive and a polymerization retarder, wherein the polymerization retarder is a liquid having a boiling point greater than 100° C., wherein the polymerization retarder is one or more of toluene, xylene, a branched aliphatic hydrocarbon and mineral oil; and
   a liquid primer composition comprising a phosphine in a carrier liquid; wherein the phosphine has the formula

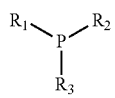

wherein each $R_1$, $R_2$, $R_3$, independently is hydrogen; a halogen; an alkyl group having from 1 to 30 carbon atoms optionally substituted; an aromatic or alkylaromatic group having from 6 to about 36 carbon atoms; optionally substituted aliphatic and/or aromatic containing ether or ester group having from 2 to about 30 carbon atoms, optionally substituted, with the proviso that at least one of $R_1$, $R_2$, and $R_3$ is said aromatic or alkylaromatic group.

8. The adhesive system according to claim 7, wherein the phosphine is present in the carrier in an amount from about 0.01 to about 20 parts by weight based on 100 total parts by weight of the primer composition, and wherein the carrier is a low boiling point liquid able to evaporate at a temperature between 10° C. and 40° C.

9. The adhesive system according to claim 8, wherein the adhesive system according to claim 3, wherein the polymerization retarder is present in an amount of from 1 to about 65 parts by weight based upon 100 total parts by weight of the adhesive composition, and wherein the primer composition carrier liquid is one or more of a hydrocarbon and a non-polar organic solvent.

10. The adhesive system according to claim 9, wherein the phosphine is present in the carrier liquid in an amount from about 0.05 to about 1 part by weight per 100 parts by weight of the primer composition, and wherein the polymerization retarder is present in an amount of about 3 to about 25 parts by weight per 100 total parts by weight of the adhesive composition.

11. The adhesive system according to claim 10, wherein the polymerization retarder is one or more of toluene and xylene, wherein the phosphorous-containing compound is triphenylphosphine, wherein the primer composition carrier liquid is one or more of naphtha, hydrotreated light naphtha, hexane, and heptane, and wherein the cyanoacrylate adhesive comprises ethylcyanoacrylate.

12. An adhesive system, comprising:
 a liquid cyanoacrylate-based adhesive composition comprising a cyanoacrylate adhesive and a polymerization retarder, wherein the polymerization retarder is a liquid having a boiling point greater than 100° C., wherein the polymerization retarder is one or more of toluene, xylene, a branched aliphatic hydrocarbon and mineral oil; wherein the polymerization retarder is present in an amount of from 1 to 65 parts by weight based upon 100 total parts by weight of the adhesive composition; and
 a liquid primer composition comprising a phosphorous-containing compound in a carrier liquid, and wherein the carrier liquid is one or more of naphtha, hydrotreated light naphtha, hexane, and heptane.

13. The adhesive system according to claim 12, wherein the phosphorous-containing compound is a phosphine, and wherein the phosphine is present in the carrier in an amount from about 0.01 to about 20 parts by weight based on 100 total parts by weight of the primer composition.

14. The adhesive system according to claim 13, wherein the phosphine has the formula

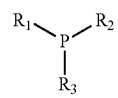

wherein each $R_1$, $R_2$, $R_3$, independently is hydrogen; a halogen; an alkyl group having from 1 to 30 carbon atoms optionally substituted; an aromatic or alkylaromatic group having from 6 to about 36 carbon atoms; optionally substituted aliphatic and/or aromatic containing ether or ester group having from 2 to about 30 carbon atoms, optionally substituted, and wherein the carrier is a low boiling point liquid able to evaporate at a temperature between 10° C. and 40° C.

15. The adhesive system according to claim 14, wherein at least one of said $R_1$, $R_2$, and $R_3$ is said aromatic or alkylaromatic group, and wherein the polymerization retarder is present in an amount of from 1 to about 55 parts by weight based upon 100 total parts by weight of the adhesive composition, and wherein the primer composition carrier liquid is one or more of a hydrocarbon and a non-polar organic solvent.

16. The adhesive system according to claim 15, wherein the phosphine is present in the carrier liquid in an amount from about 0.05 to about 1 part by weight per 100 parts by weight of the primer composition, and wherein the polymerization retarder is present in an amount of about 3 to about 25 parts by weight per 100 total parts by weight of the adhesive composition.

17. The adhesive system according to claim 12, wherein the polymerization retarder is one or more of toluene and xylene, wherein the phosphorous-containing compound is triphenylphosphine wherein the cyanoacrylate adhesive comprises ethylcyanoacrylate.

* * * * *